(12) United States Patent
Cates

(10) Patent No.: US 7,810,079 B2
(45) Date of Patent: Oct. 5, 2010

(54) SYSTEM AND METHOD FOR DETERMINING EXECUTION PATH DIFFERENCE IN PROGRAM

(75) Inventor: Claire S. Cates, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 926 days.

(21) Appl. No.: 11/656,676

(22) Filed: Jan. 23, 2007

(65) Prior Publication Data
US 2008/0178161 A1 Jul. 24, 2008

(51) Int. Cl.
G06F 9/44 (2006.01)
G06F 11/00 (2006.01)

(52) U.S. Cl. .......................... 717/133; 714/38; 714/100

(58) Field of Classification Search ................. 717/127, 717/130–133; 714/38, 100
See application file for complete search history.

(56) References Cited

U.S. PATENT DOCUMENTS

| | | | |
|---|---|---|---|
| 5,724,590 A | 3/1998 | Goettelmann et al. | |
| 5,732,272 A | 3/1998 | Gochee | |
| 5,828,883 A | 10/1998 | Hall | |
| 5,963,739 A | 10/1999 | Homeier | |
| 6,560,773 B1 | 5/2003 | Alexander, III et al. | |
| 6,782,462 B2 | 8/2004 | Marion et al. | |
| 6,934,935 B1* | 8/2005 | Bennett et al. | 717/127 |
| 6,978,401 B2* | 12/2005 | Avvari et al. | 714/38 |
| 7,079,688 B1 | 7/2006 | Deco et al. | |
| 7,093,241 B2 | 8/2006 | Huang et al. | |
| 7,143,392 B2* | 11/2006 | Ii et al. | 717/125 |
| 7,165,190 B1* | 1/2007 | Srivastava et al. | 714/38 |
| 7,257,692 B2 | 8/2007 | Schumacher | |
| 7,409,679 B2 | 8/2008 | Chedgey et al. | |
| 7,506,319 B2 | 3/2009 | Purcell et al. | |
| 7,509,632 B2 | 3/2009 | Boger | |
| 2003/0056199 A1 | 3/2003 | Li et al. | |
| 2005/0114843 A1 | 5/2005 | Gilgen et al. | |
| 2005/0166094 A1* | 7/2005 | Blackwell et al. | 714/38 |
| 2005/0183074 A1* | 8/2005 | Alexander et al. | 717/144 |

(Continued)

OTHER PUBLICATIONS

Bernat et al., "Incremental Call-Path Profiling", printed in "Concurrency and Computation: Practice and Experience", vol. 19, Issue 11, p. 1533-1547.*

(Continued)

Primary Examiner—Wei Y Zhen
Assistant Examiner—Ryan D Coyer
(74) Attorney, Agent, or Firm—Jones Day

(57) ABSTRACT

A system and method for determining execution path differences in a computer-implemented software application is provided herein. A software application under analysis is executed at least twice, thereby generating first and second call tree data and associated first and second sets of execution data describing the at least two executions of the software application. This data is then compared to determine a set of differences between the first and second executions of the program, the set of differences comprising one or more nodes that are either called differently in the first and second execution paths or executed differently in the first and second sets of execution data. For each node identified in the set of differences, the first and second call trees are then analyzed to identify at least one parent node that is the root cause of the difference in the execution data.

11 Claims, 9 Drawing Sheets

U.S. PATENT DOCUMENTS

| | | |
|---|---|---|
| 2005/0183075 A1* | 8/2005 | Alexander et al. .......... 717/144 |
| 2005/0235127 A1 | 10/2005 | Muthiah et al. |
| 2006/0085156 A1 | 4/2006 | Kolawa et al. |
| 2007/0011428 A1 | 1/2007 | Kurtz |
| 2007/0169051 A1 | 7/2007 | Krauss |

OTHER PUBLICATIONS

Lee, Soojung, "Fast, Centralized Detection and Resolution of Distributed Deadlocks in the Generalized Model", IEEECS, 2004, 13 pg.*

Wu et al., "A multi-perspective software visualization environment", IBM Press, 2000, 15 pg.*

Spivey, J.M., "Fast, accurate call graph profiling", Software Practice and Experience, vol. 34, Issue 3, pp. 249-264 [2004].

Xie, Tao et al., "An Empirical Study of Java Dynamic Call Graph Extractors", University of Washington Technical Report, pp. 1-11 [Feb. 12, 2003].

OC Systems Aprobe Technology, http://www.ocsystems.com/tech_aprobe.html, 2 pp.

OC Systems, RootCause Speeds Resolution of Performance Bottlenecks, Memory Leaks and . . . , http://www.ocsystems.com/prod_rootcause.html (2 pp.).

OC Systems SAS RootCause Client Profile, http://www.ocsystems.com/casestudy_sas.html, 2 pp.

Hitchhiker Lifecycle Application Diagnostics for C/C++, http://www.ocsystems.com/eclipse/index.html, 2 pp.

Undated paper entitled "How's Your Memory" by Claire Cates at SAS (10 pp.).

Ayers, Andrew et al., "TraceBack: First Fault Diagnosis by Reconstruction of Distributed Control Flow", PLDI '05, pp. 201-212 (Jun. 12-15, 2005).

Chilimbi, Trishul M. et al., "Low-Overhead Memory Leak Detection Using Adaptive Statistical Profiling", ASPLOS '04, Oct. 9-13, 2004, pp. 156-164.

Cole, Oliver, "Aprobe: A Non-intrusive Framework for Software Instrumentation", OC Systems, Inc., pp. 1-10.

Jump, Maria et al. "Cork: Dynamic Memory Leak Detection for Java", Technical Report TR-06-07, Jan. 2006, 10 pp.

Pevzner, P.A. et al., "Multiple Filtration and Approximate Pattern Matching", Algorithmica, 13, pp. 135-154 (1995).

Williams, Amy Lynne, "Static Detection of Deadlock for Java Libraries", Massachusetts Institute of Technology, 67 pp. (2005).

Ammons, Glen et al., "Finding and Removing Performance Bottlenecks in Large Systems", undated, 26 pp.

Begic, Goran, "An introduction to runtime analysis with Rational PurifyPlus", Nov. 19, 2003, 11 pp.

* cited by examiner

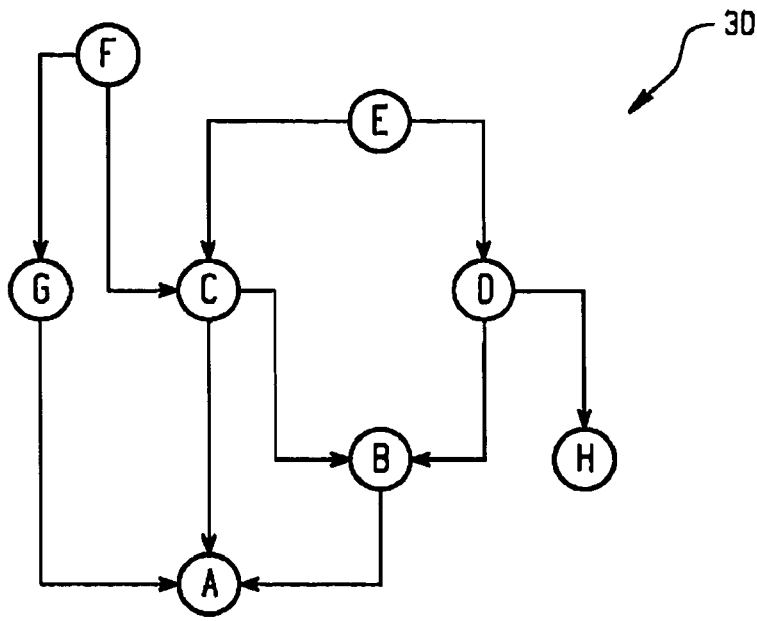

```
         STARTING AT FOCAL POINT A

1. UP TO G (FIRST PARENT OF A)
 2. UP TO F (NO PARENT)
 3. BACK TO G (NO MORE PARENTS)
 4. BACK TO A
 5. UP TO C (SECOND PARENT OF A)
 6. UP TO F (NO PARENT)
 7. BACK TO C
 8. UP TO E (NO PARENT)
 9. BACK TO C (NO MORE PARENTS)
10. BACK TO A
11. UP TO B (THIRD PARENT OF A)
12. UP TO C
13. UP TO F (NO PARENT)
14. BACK TO C
15. UP TO E (NO PARENT)
16. BACK TO C (NO MORE PARENTS)
17. BACK TO B
18. UP TO D
19. UP TO E (NO PARENT)
20. BACK TO D (NO MORE PARENTS)
21. BACK TO B (NO MORE PARENTS)
22. BACK TO A (NO MORE PARENTS)
```

*Fig. 2*

SYSTEM AND METHOD FOR DETERMINING EXECUTION PATH DIFFERENCE IN PROGRAM

BACKGROUND

1. Technical Field

The technology described in this patent application is generally directed to the field of software performance analysis and diagnostics. More specifically, the technology provides a system and method for determining execution path differences between a plurality of subroutines in a computer program and for determining the root cause of the execution path differences.

2. Description of the Related Art

Complex software applications typically comprise hundreds or even thousands of subroutines or functions, each of the subroutines typically performing a particular function or set of functions. The subroutines of the software application communicate with one another by calling one another in a variety of distinct calling paths. A call path is a communication path between two or more subroutines. Oftentimes, the calling paths in complex applications can become redundant as between two subroutines, meaning that there are several communication paths between the subroutines.

In order to visualize theses calling paths, a call tree is often developed. The call tree is a tree representation of all the software subroutines that are called while a program is executing. Within the call tree, each subroutine is represented by a node, and links between the nodes represent call paths. Several commercially available software performance analysis and diagnostic tools are available that can generate such a calling tree, such as Rational Quantify™ and Intel Vtune™, for example. This call tree data can be expressed as: (i) routine x was called; (ii) routines a and b called x; (iii)—routine x calls routines c, d, and e; and (iv) repeat the above sequence (i)-(iii) for each routine in the call path.

By using this call tree data, a complete call path for every routine of the program under analysis can be generated. The number of times that a routine is called, and how often it is called within a particular call path may also be generated along with the call tree data. By analyzing the data in the call tree, a performance analyst may be able to identify a performance bottleneck.

FIG. 1 is an example call path diagram 10 showing the execution path between four functional software routines or nodes of an exemplary computer program. In this diagram, the four nodes—afoo 12, bfoo 14, cfoo 16, and foo 18—communicate with one another through a particular set of execution paths. In this example, the software routine afoo 12 makes a direct call to bfoo 14, cfoo 16 and foo 18. In addition, the routine bfoo 14 makes a direct call to foo 18 and cfoo 16, which in turn makes another direct call to foo 18. Thus, the routine afoo 12 makes four calls to the routine foo 18, one direct call, and three indirect calls through the functions bfoo 14 and cfoo 16.

Due to the complexity of typical software applications, the calling path from one node to another, for example from afoo 12 to foo 18 may not be consistent from run to run of the program. The inconsistent operation of the program may, for example, cause the routine afoo 12 to call foo 18 a different number of times during execution of the program, or it may result in a different operating times in the routine afoo 12. It would be advantageous to be able to diagnose these run-time differences in the calling paths and execution times of the nodes of a computer program under analysis and to determine the root cause of any differences in the execution path of the program.

SUMMARY

A system and method for determining execution path differences in a computer-implemented software application is provided herein. A software application under analysis is executed at least twice, thereby generating first and second call tree data and associated first and second sets of execution data describing the at least two executions of the software application. This data is then compared to determine a set of differences between the first and second executions of the program, the set of differences comprising one or more nodes that are either called differently in the first and second execution paths or executed differently in the first and second sets of execution data. For each node identified in the set of differences, the first and second call trees are then analyzed to identify at least one parent node that is the root cause of the difference in the execution data.

BRIEF DESCRIPTION OF THE DRAWINGS

FIG. 2 is an example node traversal diagram showing a call tree and a method for traversing the nodes of the call tree;

DETAILED DESCRIPTION

Turning now to the remaining drawing figures, FIG. 2 is an example node traversal diagram 30 showing a call tree and a method for traversing the nodes of the call tree. In this example, there are eight nodes in the call tree, labeled A through G. The node A is termed the "focal node" in this diagram because it is the node currently under analysis to determine the source of its disparate operation. The "parent tree" of focal node A is shown in FIG. 2, which graphically depicts the full call paths of the nodes calling into the focal node. A "parent node" is a node in the call tree that calls a particular node under consideration, and a "child node" is a node that is called by a particular node under consideration. Other familial relationships apply to the description of the call tree as well. For example, nodes G, C and B are the parent nodes to the focal node A and thus the focal node A is the child node to nodes G, C and B. Node F is a parent node to nodes G and C, and thus it is a grandparent node to node A.

A methodology of traversing the calling paths in a call tree is termed a "node traversal function." The node traversal function provides a mechanism for tracing all of the possible paths from the focal node to the remaining nodes in the call tree to thereby determine which functions are calling the focal node, and through what paths that function is being called. An example of such steps is shown in table 32 of FIG. 2, which lists an exemplary series of steps for tracing the call paths from the focal node A to the other nodes in the call tree.

Figure 3:
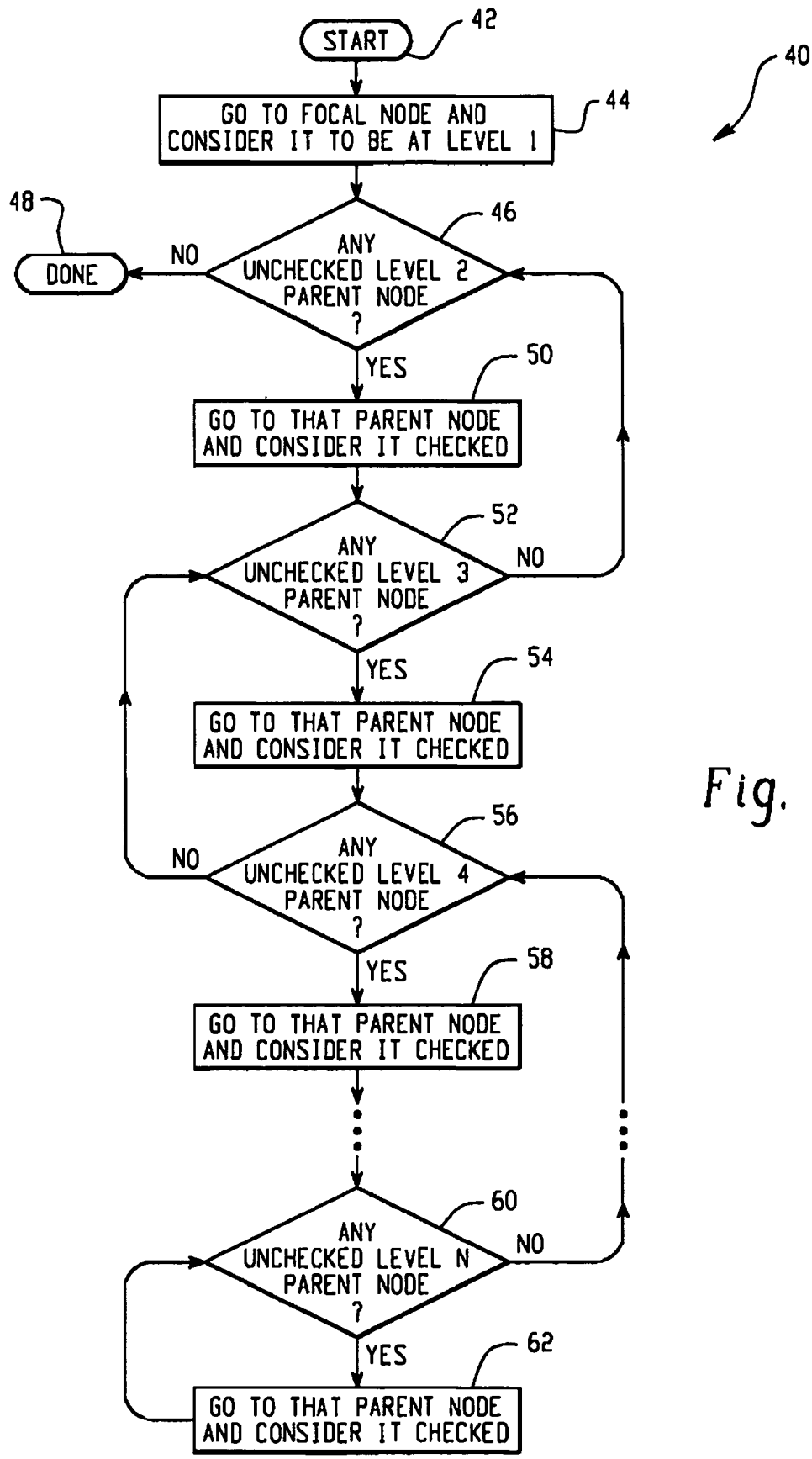
FIG. 3 is an example flow chart describing the method for traversing the nodes of the call tree shown in FIG. 2.

FIG. 3 is an example flow chart describing a method 40 for traversing the nodes of the call tree shown in FIG. 2. The method begins at 42. The method is initialized at step 44, in which a level variable of the focal node is set to a level of 1. The level variable for each node is used as a measure of the distance between any two nodes. The focal node is assigned a level of 1. Parent nodes to the focal node, therefore, have a level of 2. The parent nodes to the parent nodes of the focal node have a level of 3, and so forth. Step 46 checks to determine if there are any unchecked level 2 parent nodes to the focal node. Initially, there must be at least one such node to check. If there are no unchecked level 2 parent nodes, then the method ends at 48. If there are remaining level 2 parent nodes to be checked (i.e., call paths to the focal node to be traversed), however, then control passes to step 50.

At step 50 the method proceeds up the call tree to the next unchecked level 2 parent node, at which point that node is considered checked. From this level 2 node, the method proceeds to conduct one or more checks of any level 3 parent nodes in step 52 that are related to the current level 2 node. If, in step 52, there are no additional level 3 parent nodes to check with respect to the current level 2 node, then control passes back to step 46 to proceed on to the next level 2 parent node, if one exists. If, however, there are remaining level 3 parent nodes to check with respect to the current level 2 node, then control passes to step 54 in which the current level 3 parent node is flagged as checked. This process of checking each node at each level for additional parent nodes at higher levels continues through steps 56, 58, 60 and 62 until all N levels of the call tree are traversed and thereby checked for related nodes at different levels of the tree structure.

Table 32 of FIG. 2 shows a typical node traversal path using the methodology described in FIG. 3. The process begins at the focal node A. From here, the method traces a path up to node G, which is a level 2 parent of node A. From node G, the method then continues the path up to node F, which is a level 3 parent of node A. Node F has no level 4 parents, and thus the method returns back to node G. This node has no additional parents, other than node F, and therefore the method returns back to node A. From here, the method then traces another path from node A up to node C, which is the second level 2 parent of node A. From node C the method then proceeds to node F, a level 3 parent of node A, and then returns to node C because node F has no parent nodes. Similarly, the method then proceeds to node E from node C, and then back to node C and then back to node A. The remaining paths from node A up through the four sub-paths defined by (1) nodes B, C, and F; (2) nodes B, C and E; (3) nodes B, D, and E; and (4) nodes B and D follow a similar logical flow.

Figure 4:
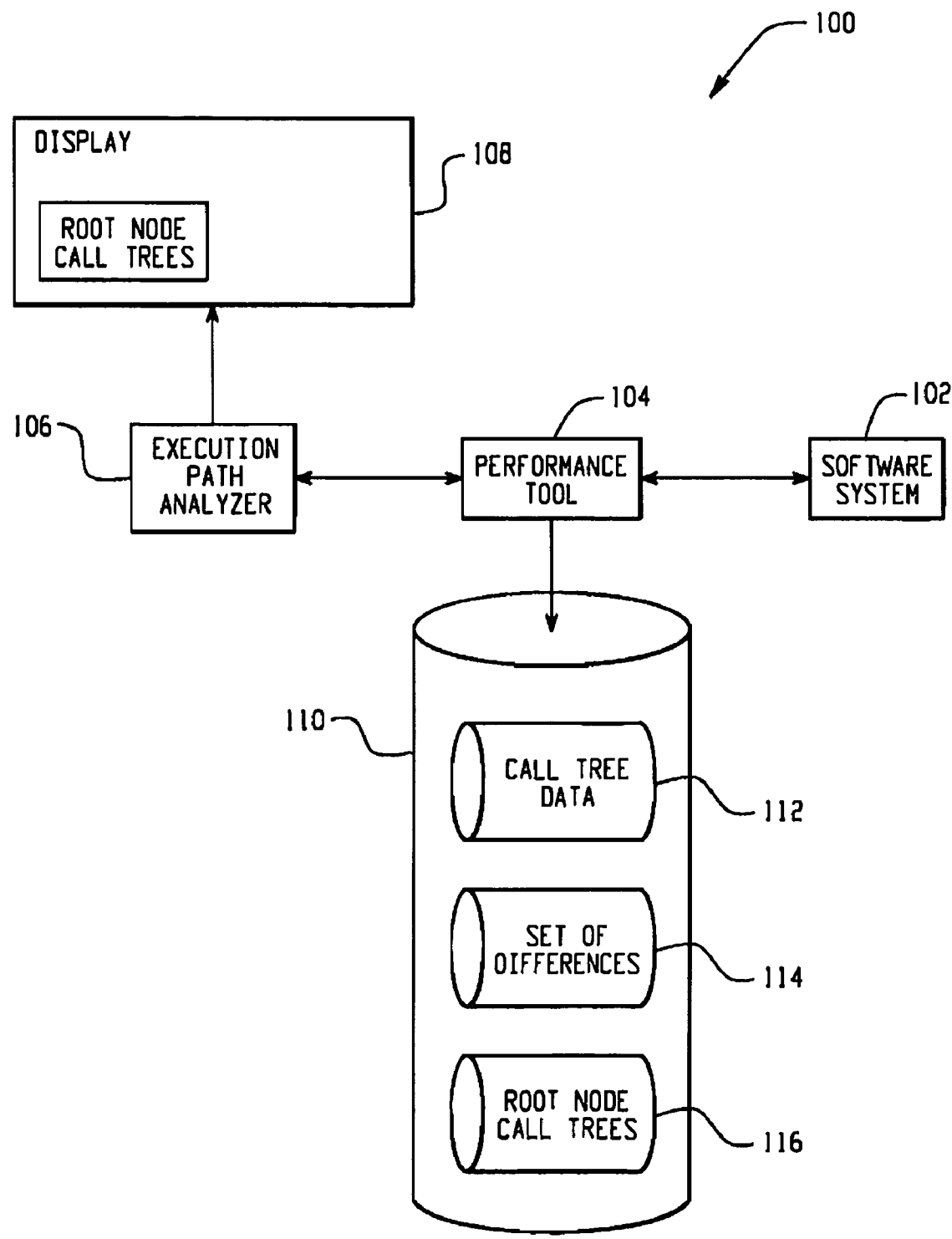
FIG. 4 is a block diagram of a system for determining execution path differences in a computer program.

FIG. 4 is a block diagram of a system 100 for determining execution path differences in a computer program. This exemplary system 100 includes an execution path analyzer 106, which may or may not be part of or integrated into a performance analysis tool 104, a display 108, a data store 110, and a software system under analysis 102. The data store includes memory for storing call tree data 112, a data file or data store 114 for maintaining information regarding the execution differences between a plurality of runs of the software system 102, and root node call trees 116. The root node call trees 116 are portions of the call tree data 112 that display nodes having different execution data associated therewith and which identify the root nodes that led to the different execution data for those nodes.

Operationally, a performance analyst may operate the performance tool 104 on the software system 102 to determine whether there are any execution path differences in the system 102. In doing so, the analyst will typically execute the software system 102, and thus all of its constituent modules, at least two times in order to generate at least two calling paths through the system 102. Additional runs (or executions) of the software system 102 may also be carried out by the analyst in order to generate additional calling path data for the system 102. The call path data for the two runs of the system 102 is then stored in the data store 112 of the memory 110. The analyst may then use the execution path analyzer 106 to analyze the call tree data 112 in order to determine: (i) whether there are any differences in the two calling paths of the system 102; and (ii) if so, then what are the software modules (or nodes) of the calling paths that caused these execution path differences. An example methodology of detecting these root nodes is set forth below. Regardless of how the root nodes are identified, however, the analyst uses the execution path analyzer 106 to identify the differences in the execution paths for storage in the memory store 114, and then to develop root node calling trees that can be graphically displayed 108 to the analyst. The root node calling tree displays the nodes of the calling path that were subject to different execution paths or run times, and also traces the calling path from these nodes back to the parent root node that resulted in the different execution data. In this manner, the execution path analyzer 106 enables the analyst to quickly visualize the nodes that are causing the differences in the execution of the software system 102 and the extent of those differences.

Figure 5:
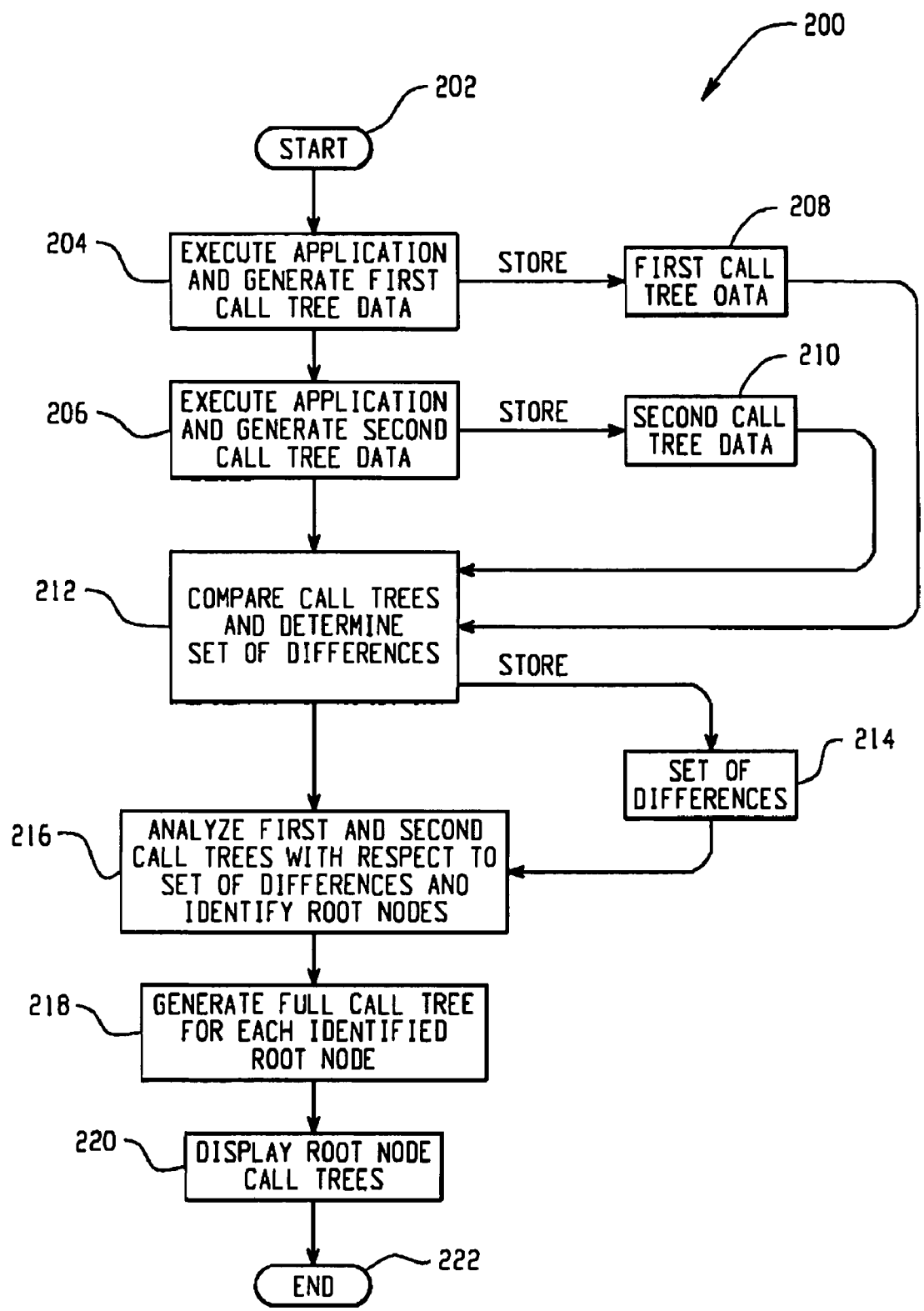
FIG. 5 is a flow diagram of an example method for determining execution path differences in a computer program.

FIG. 5 is a flow diagram 200 of an example method for determining execution path differences in a computer program 102. The method begins at 202. At step 204, the software application under analysis is executed a first time and a first set of call tree data is generated and stored 208. Then, in step 206, the application is executed a second time and a second set of call tree data is generated, which is also stored 210. Although not shown in FIG. 5, additional runs of the application may also be conducted at this point in order to generate additional call tree data for analysis. Following the generation of the two sets of call tree data, the methodology then proceeds to step 212, in which the two call trees are compared to determine whether there are any differences in their execution. These differences in execution may include, for example, a difference in the number of times that a particular child node is called by a particular parent node, a difference in the execution path of the application, or a difference in the amount of time that the application spends in any particular node. Regardless of the type of differences, step 212 identifies these differences in operation of the application as between the two runs and stores the identified differences as a set of differences 214. In this exemplary method step 212, the two calling trees are preferably merged into a single linked list in which the differences in the execution path of the application are stored 214. For example, the call tree for the first execution is traversed and compared to the call tree of the second execution. If the paths are the same, then nothing from the second call tree is merged into the first. But, where there are differences in the calling path, execution time, or number of parent-child calls, this difference data is stored along with the call tree data for the first execution, thereby merging the data from the two call trees.

Having identified the set of differences 214 between the two runs of the application, step 216 then analyzes the call tree data with respect to the identified set of differences 214 in order to determine the node or nodes that are the root cause of the different operation of the software application. An exemplary method of traversing the call trees and identifying such root nodes is described more fully below with respect to the remaining drawing figures. Once the root nodes are identified, the method proceeds to step 218, in which call tree data is identified for each of the root nodes and then it is displayed at step 220. The performance analyst is then able to view the root node call trees and quickly identify the source of the different operation of the application under analysis 102.

Figure 6:
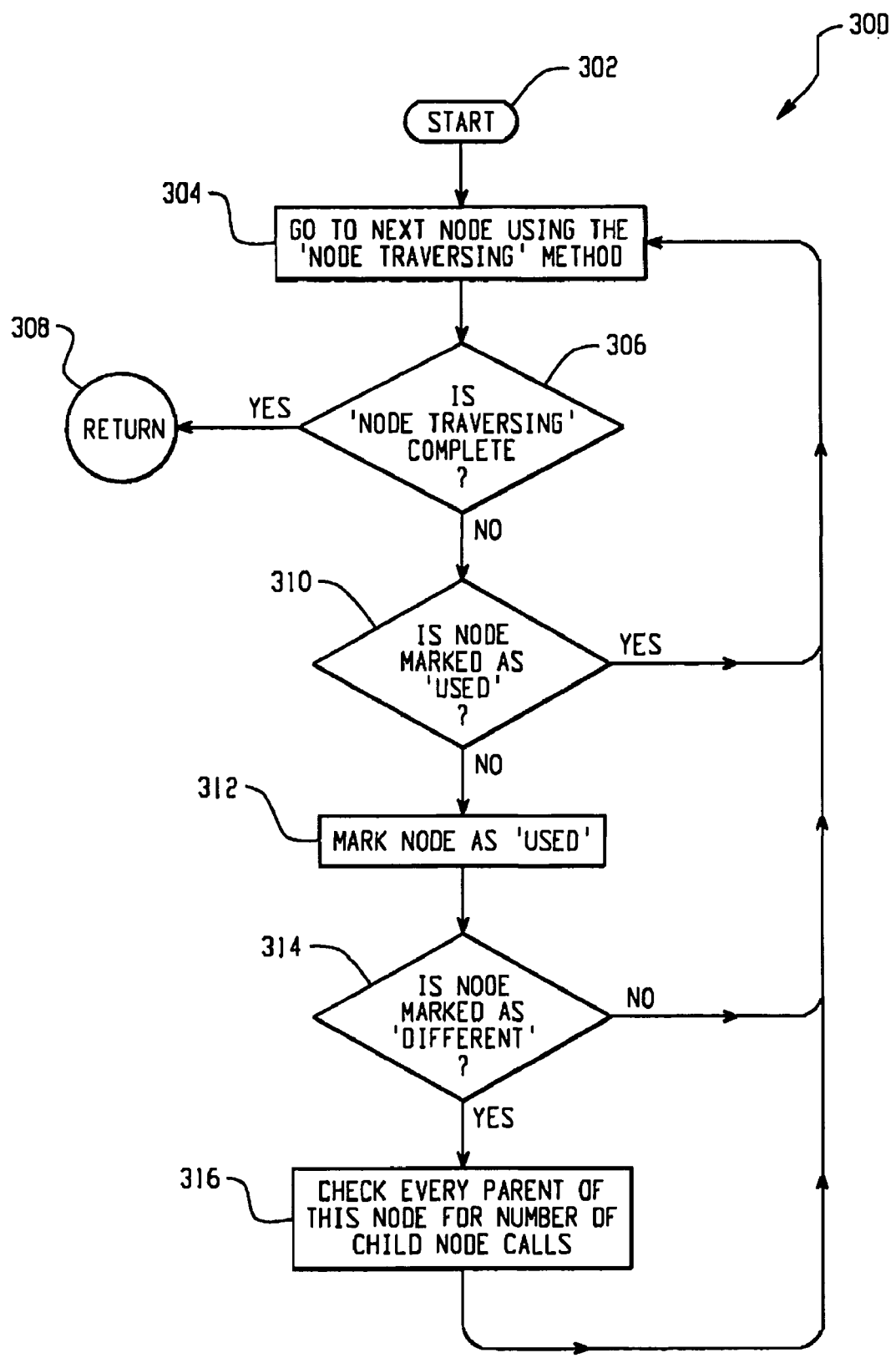
FIG. 6 is a flow diagram of an example method for analyzing first and second call trees with respect to a set of differences in the execution data between the call trees.

FIG. 6 is a flow diagram 300 of an example method for analyzing first and second call trees with respect to a set of differences in the execution data between the call trees. The method begins at 302. At step 304, the method traverses to the next node under analysis, which initially is the primary node of the call tree. If the entire tree has been traversed, then at step 306 the method ends 308. If the tree has not been fully traversed, however, then the method proceeds to step 310, where the next node is checked to determine whether it has already been analyzed. If so, then control passes back to step 304 to obtain the next node. If the next node has not been analyzed yet, then at step 312 it is marked as "used," meaning that it is about to be analyzed, and control passes to step 314. At step 314 the method examines the difference data for this node to determine whether it has been marked as "different," which means that during step 212 of FIG. 5 the methodology detected a difference in the operation of the node. If the node under analysis was not marked as "different," then control passes back to step 304 to move on to the next node in the call tree. If, however, the node under analysis was marked as being different, then control passes to step 316, in which the methodology proceeds to check every parent node of the node under analysis in order to determine the root node that caused the difference in its operation. In the example described in FIG. 6, this difference in operation is the number of times that the node under analysis was called by its parent nodes. Other differences in operation could also be analyzed.

Figure 7:
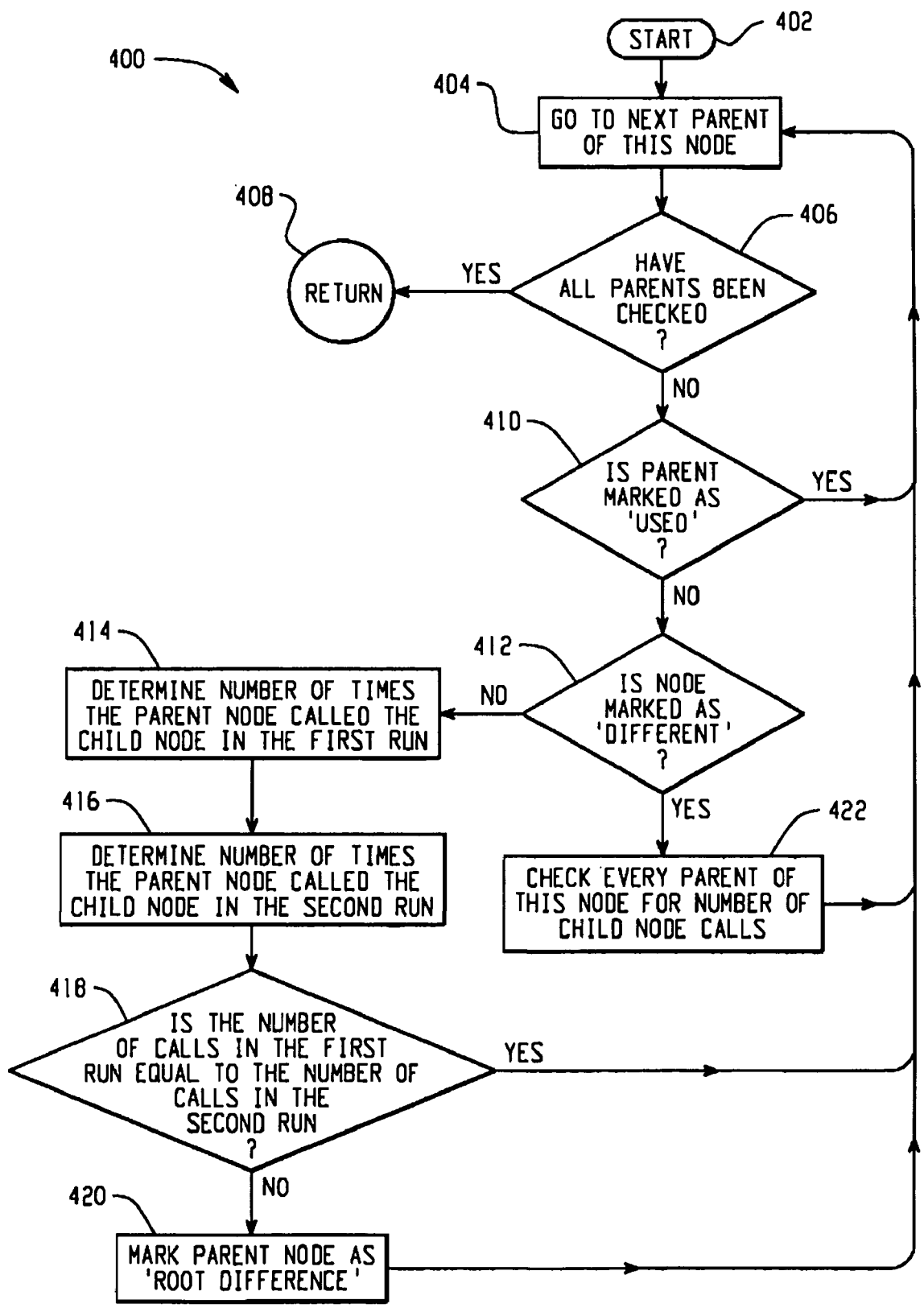
FIG. 7 is a flow diagram of an example method for checking the parent nodes of a child node having different execution data associated therewith to determine the parent node that is the root cause of the difference in the execution data for the child node.

FIG. 7 is a flow diagram 400 of an example method for checking the parent nodes of a child node having different execution data associated therewith to determine the parent node that is the root cause of the difference in the execution data for the child node. The method begins at 402. At step 404, the next parent node to the child node being analyzed is then identified. If all of the parent nodes have been checked already, as determined at step 406, then the exemplary method ends at 408. If additional parent nodes remain, however, then control passes to step 410 in which the next parent node is checked to determine if it has already been analyzed. If so, then control passes back to step 404 to iterate to the next parent node of the child node under analysis for the root cause in its disparate operation. If the next parent node has yet to be analyzed, however, then control passes to step 412.

At step 412, the parent node under analysis is checked against the stored difference data to determine if the parent node has been marked as different. If the parent node has been marked as different, then control passes to step 422, in which every parent node to this parent node is now checked to determine the root cause of the disparate operation of this parent node by looping back to step 404 and proceeding down through the rest of the method steps for this parent node. If, however, the parent node was not marked as different in step 412, then control passes to steps 414 and 416, At step 414 the method identifies the number of times that the parent node called the child node under analysis in the first execution of the application and at step 416 the method identifies the same thing for the second execution of the application. As noted previously, the amount of times that a particular child node is called in the two runs of the application is just one example of the types of differences in execution that can be detected by the present methodology. If the number of calls to the child node in both runs of the application is the same, then this parent node is not the root cause of the difference in the operation of the child node and control passes back to step 404 to traverse to the next parent node. If, however, the number of calls between the two runs is not the same, then the root cause of the difference in the operation of the child node has been identified and the parent node is marked as such 420. This process is continued until all of the nodes in the call tree have been analyzed and all of the root nodes that caused the difference in operation of the application have been identified. These root nodes, and their associated call trees to the nodes being effected by their operation, may then be displayed to a user analyzing the operation of the software application 102.

Figure 1:
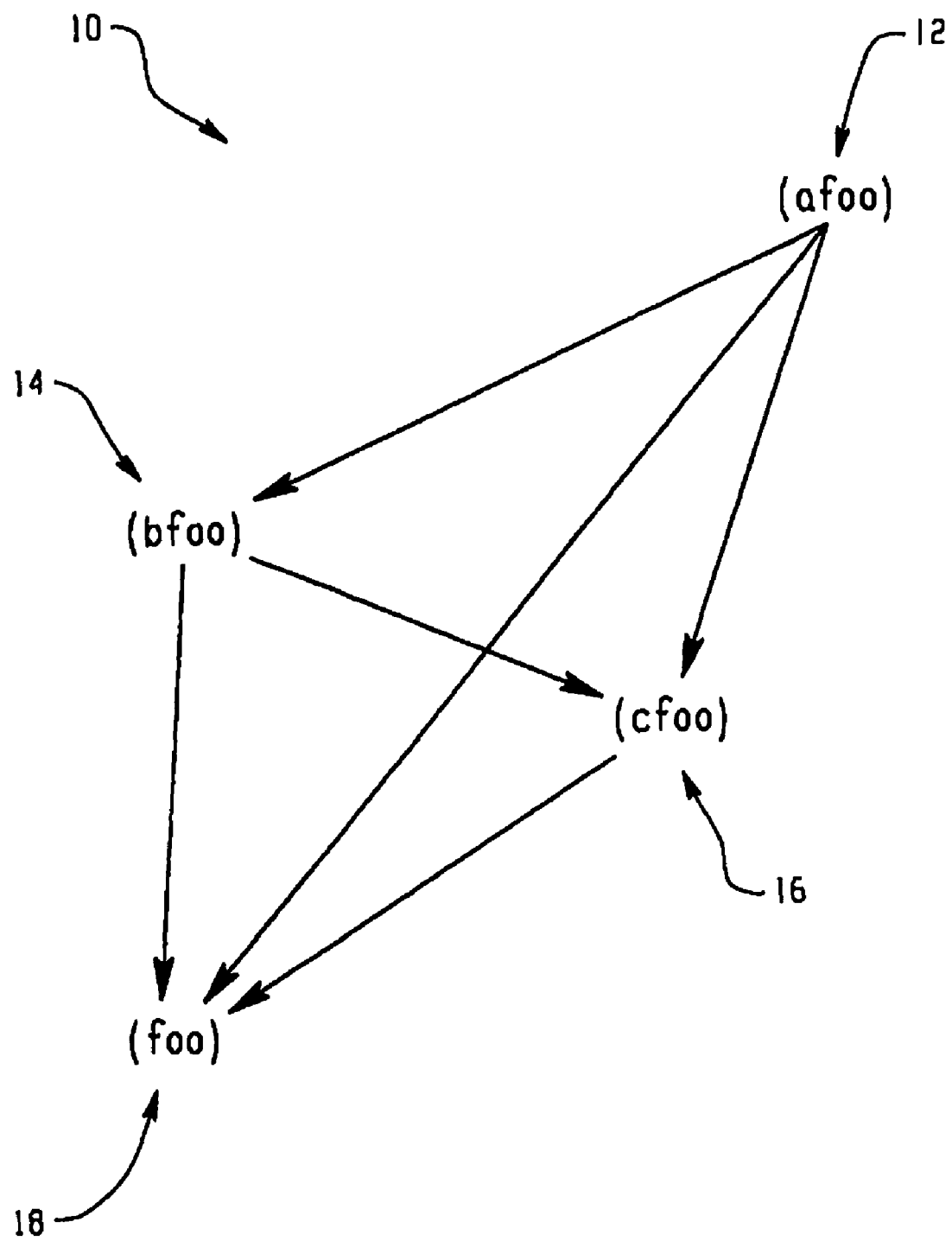
FIG. 1 is an example call path diagram showing the execution path between four functional software routines or nodes.
Figure 8:
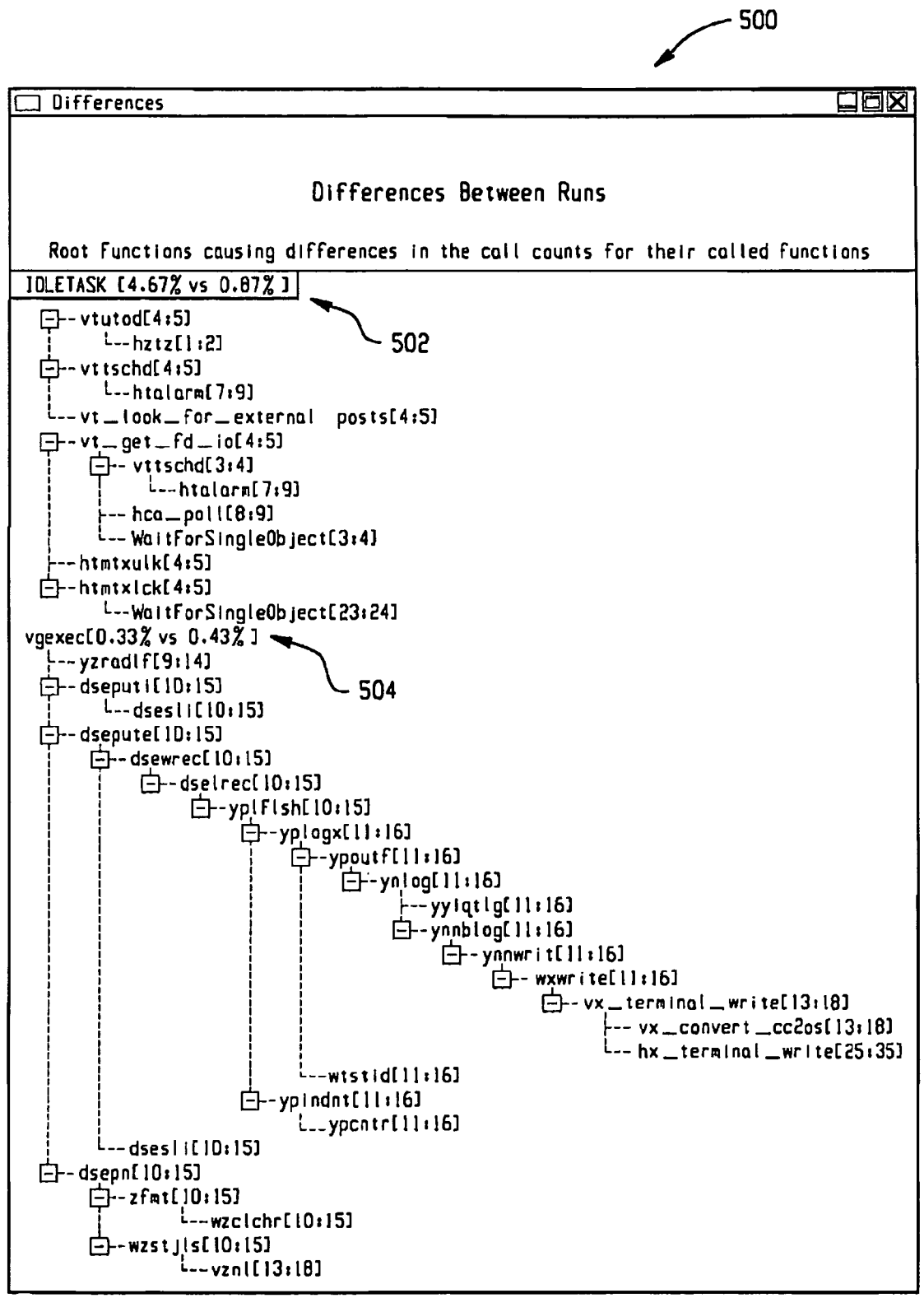
FIG. 8 is a display diagram of an example graphical interface for displaying root node call trees.

FIG. 8 is a display diagram 500 of an example graphical interface for displaying root node call trees. In this example diagram, the execution path analyzer 106 of FIG. 1, operating the example methodology of FIGS. 5-7, has been used to identify two parent nodes that are the root causes of the difference in operations between the software modules of the software program under analysis. In this case, the two root nodes are IDLETASK 502 and vgexec 504. The nodes immediately beneath each of these two root nodes are the child nodes that were marked as having a difference between the two runs of the program. The numbers in brackets indicate the number of times that a child node was called during the two runs of the application. For example, the node at the very bottom of the vgexec 504 tree, a node labeled "vznl" was called by parent node "wzstjls" 13 times in the first run of the program and 18 times during the second run of the program. The parent node "wzstjls" was in turn called 10 times during the first run and 15 times during the second run by its parent node "dsepn." This node was in turn called by its parent, the root node vgexec, 10 times during the first run and 15 times during the second run. The root node vgexec was not called a different number of times by its parent, which is why it was identified as the root cause of the difference in executions of the child nodes, although as shown in its bracketed material, it was executed 0.33% of the time in the first run and 0.43% of the time in the second run.

Figure 9:
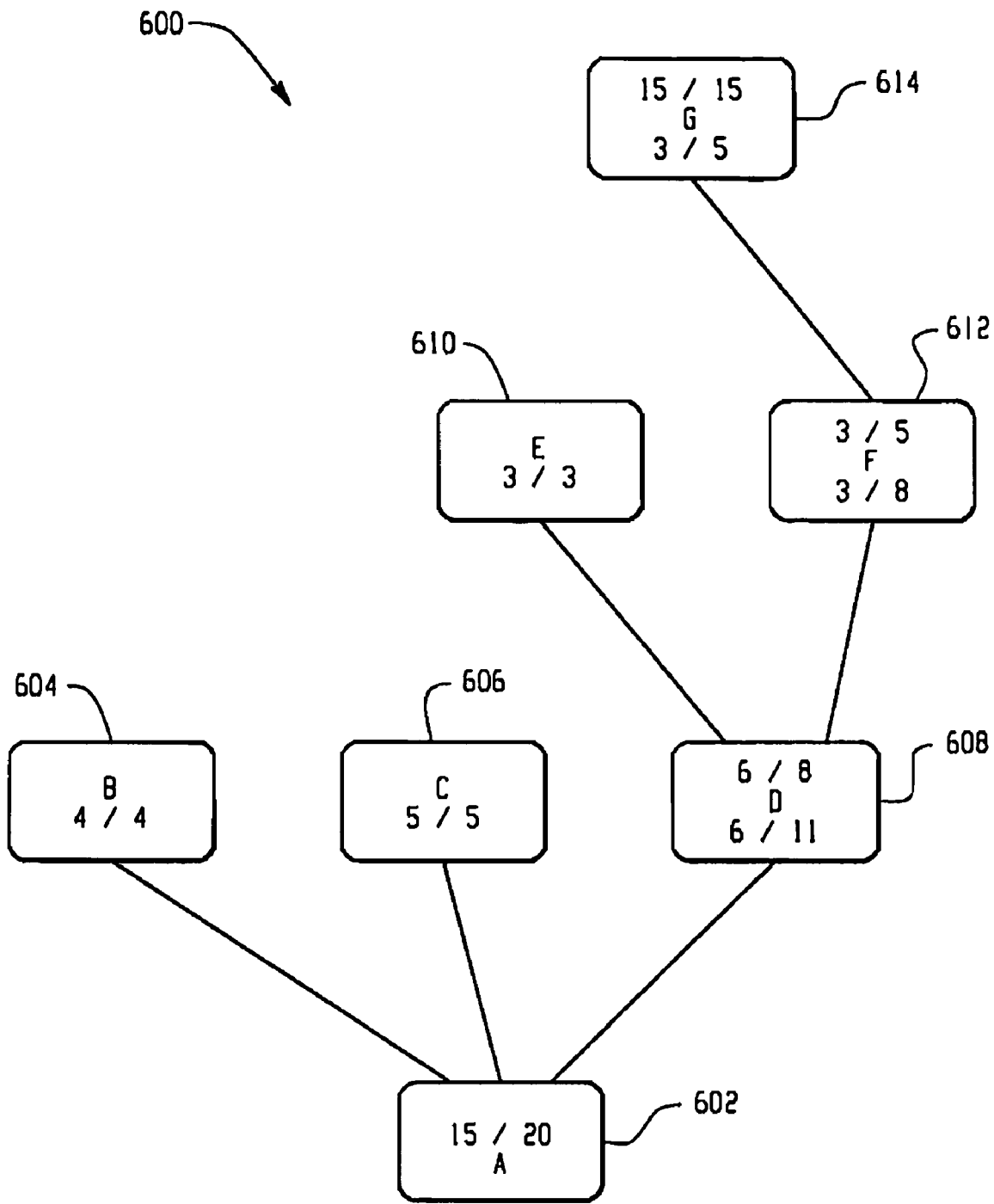
FIG. 9 is a diagram of an example portion of a call tree having merged therein difference data associated with a plurality of executions of an associated software program.

FIG. 9 is a diagram 600 of an example portion of a call tree having merged therein difference data associated with a plurality of executions of an associated software program. As described previously with respect to FIGS. 5-7, the process of finding the root node that is causing the execution differences ends when a parent node is identified that has a different number of calls to the child nodes in both runs of the program, but which itself is called the same number of times by its immediate parent. The amount of time spent in the root parent node is typically different, however, as shown in FIG. 8, because of the disparate number of calls to the child nodes.

In the example of FIG. 9, node A 602 is marked as being different between the two executions of the program under analysis, as are nodes D 602 and F 612. In this figure each node represents a particular software module of the program under analysis. The numbers below the label in each node represent the number of times that the node calls the linked child node in each run of the program. The number above the label, if present, indicate the number of times that the node was called by its linked parents. So, for example, node D 608 called node A 602 six times in the first run and eleven times in the second run, whereas node D 608 was called six times in the first run and eight times in the second run.

Turning now to node A 602, this node was called 15 times in the first run and 20 times in the second run, and therefore is marked as being different as between the two runs of the program under analysis. Node A's parent nodes are nodes B 604, C 606 and D 608. These parent nodes are then checked. Node B 604 called node A 602 four times in each run, and node C 606 called node A 602 five times in each run. Therefore, because these nodes are not calling node A 602 differently between the two runs, they are not the root cause of the difference identified with the operation of node A 602. Node D 608, however, called node A 602 six times in the first run and eleven times in the second run. Node D 608 is therefore a possible root cause of node A's behavior. But, node D 608 is marked as being different because it was called six times in the first run and eight times in the second run. Therefore, it is not the root cause of the difference and thus its' parents must be analyzed.

Nodes E 610 and F 612 are the parents of node D 608. Node E 610 calls node D 608 three times in each run, and therefore it is not the cause of any differences in the operation of node D 608. Node F 612, however, called node D 608 three times in the first run and eight times in the second run, and therefore it is a possible root cause of node D's and node A's disparate operation between the runs. But like node D608, node F 612 is also marked as different because it was called by its only parent, node G 614, three times in the first run and five times in the second run. Node F 612 is therefore not the root node. Turning finally to node G 614, although it called node F 612 a different number of times in the two runs, it was called the same number of times by its immediate parent (not shown,) Therefore, although there is likely a difference in the run-time of node G 615, because it was called the same number of times by its parent node or nodes, it is identified as the root cause of the difference between the operation of nodes F, D and A.

The systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data or other forms of data elements) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

It is claimed:

1. A computer-implemented method for determining execution path differences, comprising:

executing, using one or more processors, a software application a first time, wherein a first call tree is generated and stored, the first call tree including a first plurality of linked nodes describing a first execution path of the software application;

executing, using the one or more processors, the software application a second time, wherein a second call tree is generated and stored, the second call tree including a second plurality of linked nodes describing a second execution path of the software application, wherein the first execution of the software application generates a first set of execution data, wherein the second execution of the software application generates a second set of execution data, and wherein the first and second sets of execution data include data indicating how many times each node in the call trees was called be its parent nodes;

comparing, using the one or more processors, the first and second call trees, wherein comparing includes identifying and storing any differences between the first and second execution paths;

analyzing, using the one or more processors, each difference between the first and second execution paths, wherein analyzing includes identifying and associating at least one parent node as the root cause of each difference, and wherein analyzing includes identifying a parent node in which there is a difference in the number of times that the parent node calls its child nodes, and in which there is no difference in the number of times that the parent node is called by its parent node; and using the parent nodes associated with the differences to generate, using the one or more processors, one or more root node trees, wherein a root node tree is generated for each parent node identified as a root cause, and wherein a visual depiction of a root node tree identifies nodes associated with the differences between the first and second execution paths.

2. The method of claim 1, wherein the first execution of the software application generates a first set of execution data, wherein the second execution of the software application generates a second set of execution data, and wherein the first and second sets of execution data include data indicating an amount of time spent in each node during execution.

3. The method of claim 1, wherein comparing includes determining the number of times that each node is called by its parent nodes in the first and second call trees, wherein when there are differences in the number of times that a node is called, an indication of each difference is stored.

4. The method of claim 2, wherein comparing includes determining an amount of time spent in each node during the first and second executions of the software application, wherein when there are differences in the amount of time spent in each node during execution, an indication of each difference is stored.

5. The method of claim 1, further comprising:
   displaying a root node tree.

6. The method of claim 5, wherein execution data corresponding to the root node tree is displayed.

7. The method of claim 6, wherein the displayed execution data indicates the number of times that each node was called by its parent nodes.

8. The method of claim 6, wherein the displayed execution data indicates the amount of time spent in a particular node during the first and second execution of the software application.

9. The method of claim 1, wherein comparing includes merging data from the second call tree into the first call tree to form a merged call tree representing the first call tree and any differences between the first call tree and the second call tree.

10. A system for determining execution path differences, comprising:
  one or more processors;
  a computer-readable storage medium containing instructions configured to cause the one or more processors to perform operations, including:
  executing a software application a first time, wherein a first call tree is generated and stored, the first call tree including a first plurality of linked nodes describing a first execution path of the software application;
  executing the software application a second time, wherein a second call tree is generated and stored, the second call tree including a second plurality of linked nodes describing a second execution path of the software application, wherein the first execution of the software application generates a first set of execution data, wherein the second execution of the software application generates a second set of execution data, and wherein the first and second sets of execution data include data indicating how many times each node in the call trees was called by its parent nodes;
  comparing the first and second call trees, wherein comparing includes identifying and storing any differences between the first and second execution paths;
  analyzing each difference between the first and second execution paths, wherein analyzing includes identifying and associating at least one parent node as the root cause of each difference, and wherein analyzing includes identifying a parent node in which there is a difference in the number of times that the parent node calls its child nodes, and in which there is no difference in the number of times that the parent node is called by its parent node; and
  using the parent nodes associated with the differences to generate one or more root node trees, wherein a root node tree is generated for each parent node identified as a root cause, and wherein a visual depiction of a root node tree identifies nodes associated with the differences between the first and second execution paths.

11. A computer-program product, tangibly embodied in a non-transitory machine-readable storage medium, including instructions configured to cause a data processing apparatus to:
  execute a software application a first time, wherein a first call tree is generated and stored, the first call tree including a first plurality of linked nodes describing a first execution path of the software application;
  execute the software application a second time, wherein a second call tree is generated and stored, the second call tree including a second plurality of linked nodes describing a second execution path of the software application, wherein the first execution of the software application generates a first set of execution data, wherein the second execution of the software application generates a second set of execution data, and wherein the first and second sets of execution data include data indicating how many times each node in the call trees was called be its parent nodes;
  compare the first and second call trees, wherein comparing includes identifying and storing any differences between the first and second execution paths;
  analyze each difference between the first and second execution paths, wherein analyzing includes identifying and associating at least one parent node as the root cause of each difference, and wherein analyzing includes identifying a parent node in which there is a difference in the number of times that the parent node calls its child nodes, and in which there is no difference in the number of times that the parent node is called by its parent node; and
  use the parent nodes associated with the differences to generate one or more root node trees, wherein a root node tree is generated for each parent node identified as a root cause, and wherein a visual depiction of a root node tree identifies nodes associated with the differences between the first and second execution paths.

* * * * *